(12) United States Patent
He et al.

(10) Patent No.: US 9,935,878 B2
(45) Date of Patent: *Apr. 3, 2018

(54) CONNECTING A PVLAN SWITCH TO A NON-PVLAN DEVICE

(71) Applicant: International Business Machines Corporation, Armonk, NY (US)

(72) Inventors: Guo X. He, Suzhou (CN); Gang Tang, Nanjing (CN); Yi J. Zhu, Wuxi (CN); Zheng D. Zhu, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/421,538

(22) Filed: Feb. 1, 2017

(65) Prior Publication Data

US 2017/0142009 A1 May 18, 2017

Related U.S. Application Data

(63) Continuation of application No. 14/609,495, filed on Jan. 30, 2015, now Pat. No. 9,584,339.

(30) Foreign Application Priority Data

Feb. 27, 2014 (CN) .......................... 2014 1 0068890

(51) Int. Cl.
*H04L 12/56* (2006.01)
*H04J 3/16* (2006.01)
(Continued)

(52) U.S. Cl.
CPC .......... *H04L 45/74* (2013.01); *H04L 12/4641* (2013.01); *H04L 49/70* (2013.01)

(58) Field of Classification Search
CPC .. H04Q 11/0478; H04L 12/5601; H04L 12/44
See application file for complete search history.

(56) References Cited

U.S. PATENT DOCUMENTS 7,574,202 B1 * 8/2009 Tsao .................... H04L 63/0272
370/310
7,606,939 B1 10/2009 Finn
(Continued)

FOREIGN PATENT DOCUMENTS

CN          1771150 A      5/2006
CN         10189527 A      11/2010
(Continued)

OTHER PUBLICATIONS

IBM, List of IBM Patents or Patent Applications Treated as Related, Appendix P, dated Feb. 2, 2017, 2 pages.
(Continued)

*Primary Examiner* — Faruk Hamza
*Assistant Examiner* — Abu-Sayeed Haque
(74) *Attorney, Agent, or Firm* — David Zwick

(57) ABSTRACT

A PVLAN switch for connecting a PVLAN to a non-PVLAN device is configured as a primary VLAN with secondary VLANs, the primary VLAN includes promiscuous ports, each of the secondary VLANs includes a smart PVLAN trunk port, and the smart PVLAN trunk port is included in at least two secondary VLANs where the smart PVLAN trunk port and the promiscuous port connect to non-PVLAN devices. A frame is received on a smart PVLAN trunk port sent from a non-PVLAN device, and includes a destination address and a secondary VLAN ID. The PVLAN switch port ID for the first frame, and a primary VLAN ID for the secondary VLAN ID are identified. If the frame is a non-isolated port, the secondary VLAN ID is modified to be the primary VLAN ID, and the modified
(Continued)

S201, receive a first frame on a smart PVLAN trunk port sent from a non-PVLAN device connected to the smart PVLAN trunk port S203, in response to that the first frame comprises a secondary VLAN ID, the PVLAN switch port ID corresponding to the first frame and primary VLAN ID related to the secondary VLAN ID included in the first frame can be obtained based on the destination address of the first frame, and the PVLAN switch port corresponding to the first frame is a non-isolated port: modify the secondary VLAN ID in the first frame into the primary VLAN ID related to the secondary VLAN ID; and send the modified first frame to the non-PVLAN device connected to the PVLAN switch port corresponding to the first frame from the PVLAN switch port corresponding to the first frame frame is sent to another non-PVLAN device connected to the PVLAN switch port.

20 Claims, 6 Drawing Sheets

(51) Int. Cl.
*H04J 3/00* (2006.01)
*H04L 12/28* (2006.01)
*H04L 12/741* (2013.01)
*H04L 12/46* (2006.01)
*H04L 12/931* (2013.01)

(56) References Cited

U.S. PATENT DOCUMENTS

| | | | |
|---|---|---|---|
| 7,710,959 B2 | 5/2010 | Ramasamy et al. | |
| 7,912,091 B1* | 3/2011 | Krishnan | H04L 45/02 370/490 |
| 7,953,089 B1* | 5/2011 | Ramakrishnan | H04L 12/4641 370/392 |
| 8,798,059 B1* | 8/2014 | Kommula | H04L 12/4641 370/389 |
| 8,948,176 B1* | 2/2015 | Desanti | H04L 45/44 370/351 |
| 9,215,176 B2 | 12/2015 | Lee | |
| 9,331,872 B2 | 5/2016 | Emmadi et al. | |
| 2002/0091795 A1 | 7/2002 | Yip | |
| 2008/0031261 A1* | 2/2008 | Addeo | H04L 43/00 370/395.53 |
| 2010/0329265 A1 | 12/2010 | Lapuh et al. | |
| 2012/0099425 A1* | 4/2012 | Wang | H04L 45/28 370/225 |
| 2012/0176893 A1* | 7/2012 | Ghanwani | H04L 12/4641 370/230 |
| 2012/0275787 A1* | 11/2012 | Xiong | H04L 49/357 398/45 |
| 2012/0287936 A1 | 11/2012 | Biswas et al. | |
| 2012/0331142 A1 | 12/2012 | Mittal et al. | |
| 2013/0301425 A1 | 11/2013 | Udutha et al. | |
| 2013/0308647 A1* | 11/2013 | Rosset | H04L 12/4641 370/395.53 |
| 2013/0315252 A1* | 11/2013 | Emmadi | H04L 12/4641 370/395.53 |
| 2014/0281669 A1* | 9/2014 | DeCusatis | G06F 11/2005 714/4.11 |
| 2014/0355409 A1* | 12/2014 | Fitzgerald | H04L 45/28 370/216 |
| 2014/0369229 A1* | 12/2014 | Martineau | H04L 45/02 370/254 |

FOREIGN PATENT DOCUMENTS

| | | |
|---|---|---|
| CN | 101895427 A | 11/2010 |
| CN | 101977247 A | 2/2011 |
| CN | 104883325 A | 9/2015 |

OTHER PUBLICATIONS

Pending U.S. Appl. No. 14/609,495, filed Jan. 30, 2015, entitled "Connecting a PVLAN Switch to a Non-PVLAN Evice", 35 pages.
IEEE, 802.1Qbg—Edge Virtual Bridging, "IEEE Standard for Local and Metropolitan Area Networks—Virtual Bridged Local Area Networks-Amendment: Edge Virtual Bridging," PAR approved on Dec. 9, 2012; Standard approved May 14, 2012, http://www.ieee802.org/1/pages/802.1bg.html, Accessed on: Jan. 12, 2015.
Juniper Networks, Inc., "Configuring Private VLANs on a QFX Switch Using Extended Functionality," Network configuration Example, Feb. 11, 2013, Release 13.1.
Aashish, "Is it possible to extend PVLAN (Community Secondary VLAN) across a trunk?," Cisco Support Community, Apr. 20, 2005, https://supportforums.cisco.com/discussion/9621511/it-possible-extend-pvlan-community-secondary-vlan-across-trunk, Accessed on: Aug. 1, 2013.
Cisco Systems, "Scalable Security in a Multi-Client Environment", http://www.sk-kari.put.poznan.pl/Rfc/pdfrfc/rfc5517.txt.pdf, Feb. 2010, pp. 1-12.
Office Action, dated Sep. 5, 2017, 10034, PN 134469, Application No. 201410068890.X, filed Feb. 27, 2014, pp. 1-5.

* cited by examiner

S201, receive a first frame on a smart PVLAN trunk port sent from a non-PVLAN device connected to the smart PVLAN trunk port

S203, in response to that the first frame comprises a secondary VLAN ID, the PVLAN switch port ID corresponding to the first frame and primary VLAN ID related to the secondary VLAN ID included in the first frame can be obtained based on the destination address of the first frame, and the PVLAN switch port corresponding to the first frame is a non-isolated port: modify the secondary VLAN ID in the first frame into the primary VLAN ID related to the secondary VLAN ID; and send the modified first frame to the non-PVLAN device connected to the PVLAN switch port corresponding to the first frame from the PVLAN switch port corresponding to the first frame

Fig. 2

CONNECTING A PVLAN SWITCH TO A NON-PVLAN DEVICE

BACKGROUND

The present invention relates to computer networks, particularly to private virtual local area networks (PVLAN), and more particularly, to a PVLAN switch and method of its connecting to a non-PVLAN device.

As known in the field of computer network, a single Layer Two (L2) network, may be partitioned into a plurality of broadcast domains which are isolated from each other, so that data frames may be transferred between them only via one or more routers. Such a domain is called a virtual local area network (VLAN). Currently the most common protocol for configuring a VLAN is IEEE 802.1Q, according to which each Ethernet frame is added with a VLAN tag, which includes the identification (ID) of the VLAN to which the frame belongs, so that devices such as switches may determine the VLAN to which the frame belongs according to the VLAN ID.

PVLAN is a VLAN-based computer networking technology for implementing communication isolation among ports. PVLAN relates to several concepts and understanding these concepts will facility better understanding of the present invention. The following will introduce the involved concepts one by one.

PVLAN includes three different types of sub-VLANs, which are primary VLANs, community VLANs, and isolated VLANs. Community VLANs and isolated VLANs are collectively called secondary VLANs. In the three types of VLANs included in a PVLAN, one of the VLANs may communicate with all the other VLANs, and it is called a primary VLAN. Usually the primary VLAN may also be used to represent the entire PVLAN. If all the ports in a VLAN may communicate with each other and also communicate with a port in the primary VLAN, this VLAN is called a community VLAN. If all the ports in a VLAN cannot communicate with each other and may only communicate with a port in the primary VLAN, this VLAN is called an isolated VLAN. In a PVLAN, a community VLAN and an isolated VLAN are subordinate to the primary VLAN, or in other words, the community VLAN and the isolated VLAN are related to the primary VLAN. This is the reason why the community VLAN and the isolated VLAN are called secondary VLANs.

The ports included in a primary VLAN are called promiscuous ports, which are usually connected to uplink routers, firewalls and servers. The ports included in a community VLAN are called community ports. The ports included in an isolated VLAN are called isolated ports. Community ports and isolated ports are also called host ports, because these ports are usually connected to downlink hosts. A PVLAN switch may include several promiscuous ports, several community ports and several isolated ports.

The communication isolation rules in a PVLAN are as follows:

1) The promiscuous ports may communicate with all the community ports and isolated ports.

2) The community ports may communicate with all the ports in the same community VLAN, and may also communicate with the promiscuous ports. However, they cannot communicate with the ports in a different community VLAN.

3) The isolated ports may only communicate with the promiscuous ports.

According to the above rules, flows may be isolated within the switch.

When ports are in a plurality of VLANs simultaneously, they are called trunk ports. That is, promiscuous ports simultaneously in a plurality of primary VLANs are called trunk promiscuous ports; community ports simultaneously in a plurality of community VLANs are called trunk community ports; isolated ports simultaneously in a plurality of isolated VLANs are called trunk isolated ports; and trunk community ports and trunk isolated ports are also collectively called trunk host ports.

In the present invention, references to promiscuous ports, community ports, isolated ports, trunk promiscuous ports, trunk community ports, and trunk isolated ports are meant to be PVLAN promiscuous ports, PVLAN community ports, PVLAN isolated ports, PVLAN trunk promiscuous ports, PVLAN trunk community ports, and PVLAN trunk isolated ports. The omission of the prefix PVLAN is only for convenience.

Currently there are two types of PVLAN trunk ports, i.e., the above-mentioned PVLAN trunk promiscuous ports and PVLAN trunk isolated ports. When a frame from a PVLAN trunk isolated port is to be transmitted from a PVLAN trunk promiscuous port, the 802.1Q tag of the frame will be rewritten with a proper primary VLAN ID. When a PVLAN trunk promiscuous port receives a frame from the primary VLAN, the 802.1Q tag of the primary VLAN ID carried by the frame will be re-written with the isolated VLAN ID.

Thus a PVLAN trunk promiscuous port may simultaneously transmit information from a plurality of primary VLANs from the PVLAN switch to a non-PVLAN device, and a PVLAN isolated port may simultaneously transmit information from a plurality of isolated VLANs to a non-PVLAN device. However, the two current PVLAN trunk ports cannot simultaneously transmit information from a plurality of community VLAN from the PVLAN switch to a non-PVLAN device.

It can be seen that an improved PVLAN switch and a method of its connecting to a non-PVLAN device may be advantageous in the field, so that during deployment, even if the PVLAN switch is connected to a non-PVLAN device, community VLAN information may be transmitted from the PVLAN switch to the non-PVLAN device.

SUMMARY

Embodiments of the present invention disclose a method and PVLAN switch for connecting a private virtual local area network PVLAN switch to a non-PVLAN device, where the PVLAN switch is configured as a primary VLAN with at least two secondary VLANs related to the primary VLAN, the primary VLAN includes at least one promiscuous port, each of the at least two secondary VLANs includes at least one smart PVLAN trunk port, and the at least one smart PVLAN trunk port is included in at least two secondary VLANs wherein the smart PVLAN trunk port and the promiscuous port are for connecting non-PVLAN devices. A first frame is received on a smart PVLAN trunk port sent from a non-PVLAN device connected to the smart PVLAN trunk port, the first frame including a destination address and a secondary VLAN ID. Based on the destination address of the first frame, the PVLAN switch port ID corresponding to the first frame, and the primary VLAN ID related to the secondary VLAN ID are identified. In response to determining that the PVLAN switch port corresponding to the first frame is a non-isolated port, the secondary VLAN ID in the first frame is modified to be the primary VLAN ID related to the secondary VLAN, and the modified first frame is sent to another non-PVLAN device connected to the PVLAN switch port corresponding to the first frame from the PVLAN switch port corresponding to the first frame.

The solutions according to embodiments of the present invention may connect information from all types of secondary VLANs, including isolated secondary VLANs and the community secondary VLANs, from the PVLAN switch to non-PVLAN devices.

BRIEF DESCRIPTION OF THE SEVERAL VIEWS OF THE DRAWINGS

The above and other objects, features and advantages of the present disclosure will become more apparent through the more detailed description of embodiments of the present disclosure in conjunction with the accompanying drawings, wherein like reference numerals generally refers to like components in the embodiments of the present disclosure.

FIG. 2 shows a flow of a method for connecting a PVLAN switch to a non-PVLAN switch according to an embodiment of the present invention.

DETAILED DESCRIPTION

Figure 1:
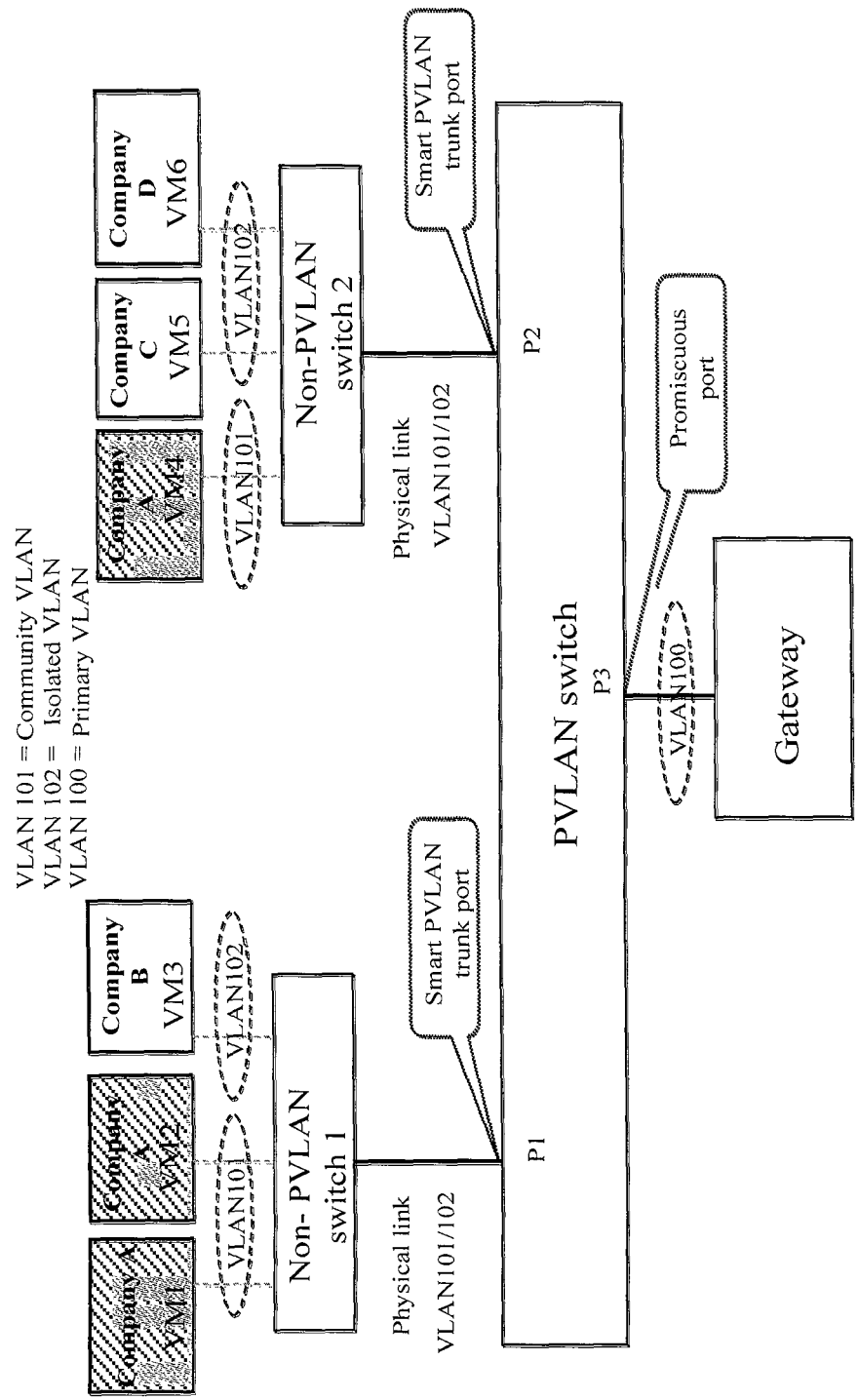
FIG. 1 shows an exemplary virtualized environment in which the PVLAN switch according to an embodiment of the present invention operates.

FIG. 1 is a functional block diagram illustrating a distributed data processing environment 100, in accordance with an embodiment of the present invention.

Some preferred embodiments will be described in more detail with reference to the accompanying drawings, in which the preferred embodiments of the present disclosure have been illustrated. However, the present disclosure can be implemented in various manners, and thus should not be construed to be limited to the embodiments disclosed herein. On the contrary, those embodiments are provided for a thorough and complete understanding of the present disclosure, and for completely conveying the scope of the present disclosure to those skilled in the art.

In order to solve the technical problem presented in the background art, the present invention defines a smart PVLAN trunk port. The port can not only transfer community VLAN information from the PVLAN switch to a non-PVLAN device, but also transfer information from an isolated VLAN and a community VLAN to a non-PVLAN device. That is, the smart PVLAN trunk port may only belong to a plurality of community VLANs, or belong to a plurality of community VLANs and isolated VLANs simultaneously.

Referring to FIG. 1, an exemplary virtualized environment is shown in which the PVLAN switch according to an embodiment of the present invention operates. As shown, the PVLAN switch has a promiscuous port P3, and two smart PVLAN trunk ports P1 and P2. The promiscuous port P3 is connected to a gateway (a non-PVLAN device), and the two smart PVLAN trunk ports are connected to non-PVLAN switches 1 and 2 respectively; the non-PVLAN switches 1 and 2 may be two virtual switches. The virtual switches are located at the hypervisors on two physical servers respectively. It should be noted that the virtual switch used here is merely an application scenario, and is not restriction of the present invention. The non-PVLAN switch 1 is connected to virtual machines VM1, VM2, and VM3; the non-PVLAN switch 2 is connected to virtual machines VM4, VM5, and VM6. On the PVLAN switch are configured a primary VLAN 100, and community secondary VLAN 101 and isolated secondary VLAN 102. Virtual machines VM1, VM2 and VM4 are included in the community secondary VLAN 101, and here are assumed to belong to company A, so that they can communicate with each other; virtual machines VM3, VM5 and VM6 are included in the isolated secondary VLAN 102, and here are assumed to belong to companies A, B, and C respectively, so that they cannot communicate with each other. It can be seen that the community secondary VLAN 101 and the isolated secondary VLAN 102 both cross a non-PVLAN switch (the non-PVLAN switch 1 and non-PVLAN switch 2), and each non-PVLAN switch is related to the two secondary VLANs (community VLAN 101 and isolated VLAN 102), so that each smart PVLAN trunk port and their links will transfer the frames of the two secondary VLANs. Similarly, here virtual machines VM can also be other physical hosts.

If there is no smart PVLAN trunk port proposed by the present invention, P1 and P2 in FIG. 1 are merely ordinary trunk ports, then VLAN 101 where VM1 and VM2 are located and VLAN 102 where VM3 is located need two links to be connected to the PVLAN switch, and the PVLAN needs two ports; similarly, VLAN 101 where VM4 and VM5 are located and VLAN 102 where VM6 is located also need two links to be connected to the PVLAN switch, and the PVLAN further needs two ports, so the PVLAN switch needs 4 ports in total. The smart PVLAN trunk ports introduced by the present invention may reduce the number of links and ports used in communication of the PVLAN switch.

Those skilled in the art may appreciate that the above described and illustrated PVLAN switch and its operation environment according to the embodiment of the present invention are merely exemplary, rather than limitation to the present invention. For example, the PVLAN switch may also be configured with other promiscuous ports or trunk promiscuous port, and correspondingly, may be configured with other primary VLANs. The PVLAN switch may also be configured with any other number and types of secondary VLANs. The PVLAN switch may be configured with any other number and types of community ports, trunk community ports, isolation ports, trunk isolation ports (additionally, the PVLAN switch may also be configured with trunk ports for connecting to other PVLAN switches, and configured with ordinary VLAN ports outside of PVLAN). The PVLAN switch may connect to any other number of other non-PVLAN switches, and each non-PVLAN switch may connect to any other number of VMs, and the VMs may be divided into any secondary VLAN.

In summary, the improvement of the PVLAN switch according to the present invention mainly lies in the tag rewriting executed by its smart PVLAN trunk port: the smart PVLAN trunk port may smartly rewrite the VLAN tag in the frame before sending the frame.

FIG. 2 shows the flow of a method of connecting a PVLAN switch to a non-PVLAN device according to an embodiment of the present invention, wherein the PVLAN switch is configured as a primary VLAN and at least two secondary VLANs related to the primary VLAN, and the primary VLAN includes at least one promiscuous port, and each of the at least two secondary VLANs includes at least one smart PVLAN trunk port, which is included in at least two secondary VLANs, wherein the smart PVLAN trunk port and the promiscuous port are for connecting non-PVLAN devices.

According to FIG. 2, the method comprises:

At step S201, receive a first frame on a smart PVLAN trunk port sent from the non-PVLAN device connected to the smart PVLAN trunk port.

At step S203, in response to that the first frame includes the secondary VLAN ID, the PVLAN switch port ID corresponding to the first frame and the primary VLAN ID related to the secondary VLAN ID included in the first frame can be obtained based on the destination address of the first frame, and the PVLAN switch port corresponding to the first frame is a non-isolated port: modify the secondary VLAN ID in the first frame into the primary VLAN ID related to the secondary VLAN ID; and send the modified first frame to the non-PVLAN device connected to the PVLAN switch port corresponding to the first frame from the PVLAN switch port corresponding to the first frame.

According to an embodiment of the present invention, the non-isolated port is one of: a promiscuous port; and a smart PVLAN trunk port.

In a preferred embodiment of the present invention, the method further comprises step S202 (not shown in FIG. 2) to store the source address of the first frame, the secondary VLAN ID and its related primary VLAN ID, and the PVLAN switch port ID corresponding to the first frame. This step may be performed before or after step S203. In fact, this is an address learning process of the PVLAN switch. Those skilled in the art may know that if the source address of the first frame, the secondary VLAN ID and its related primary VLAN ID and the PVLAN switch port ID corresponding to the first frame have been stored, then the learning process may be omitted. In addition, those skilled in the art may also know that here the source address and the destination address of the frame may be MAC addresses or IP addresses, or any unique addresses defined in the network. The following description takes MAC addresses as example.

Figure 3:
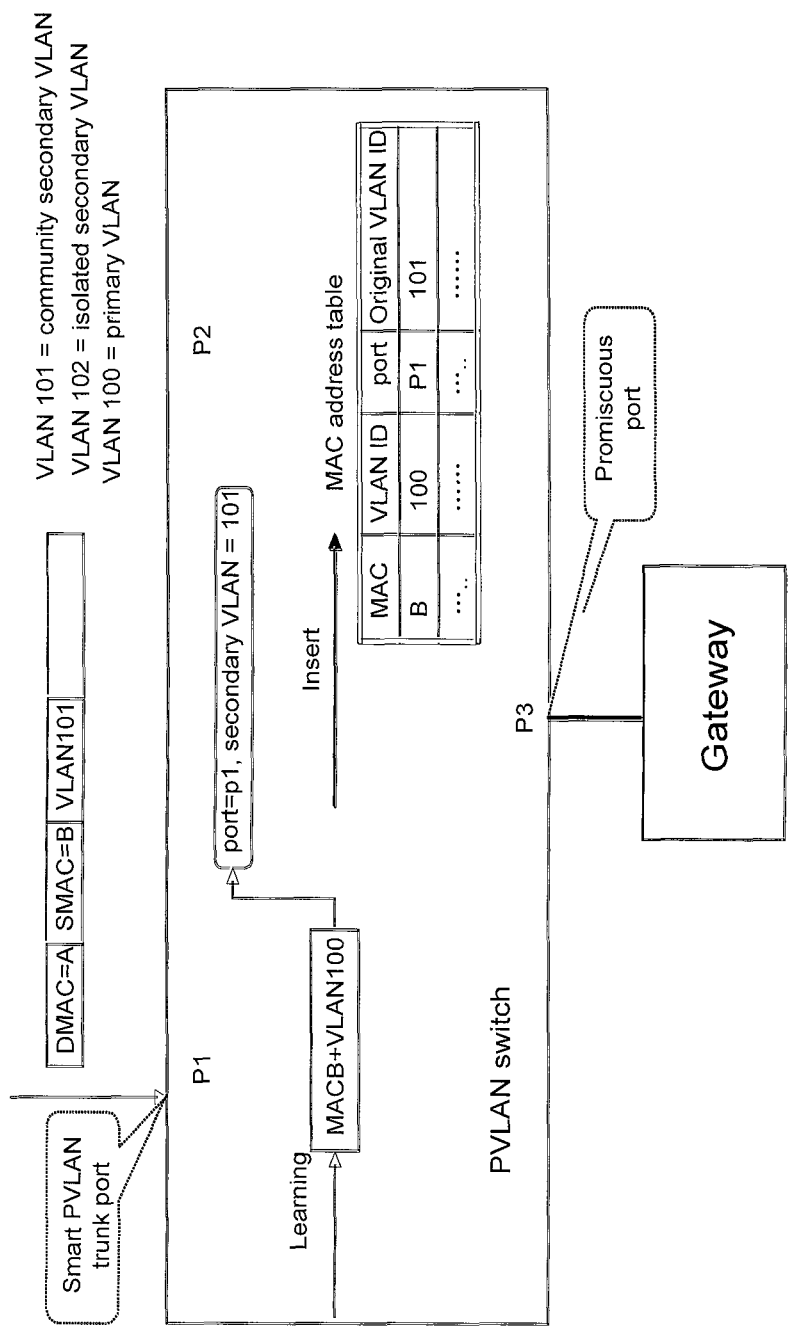
FIG. 3 exemplarily and schematically shows an improved MAC address learning process of the PVLAN switch according to an embodiment of the present invention.

Referring to FIG. 3, it exemplarily and schematically shows the improved MAC address learning process of the PVLAN switch according to an embodiment of the present invention.

As the example shown in FIGS. 1, P1 and P2 ports of the PVLAN switch are both smart PVLAN trunk ports according to an embodiment of the present invention, each smart PVLAN trunk port may connect to a plurality of community secondary VLANs (e.g., VLAN 101) and/or isolated secondary VLANs (e.g., VLAN 102). For a community secondary VLAN (e.g., VLAN 101) connected to a smart PVLAN trunk port (e.g., P1), its traffic may be forwarded to a promiscuous port (e.g., p3), and other smart PVLAN trunk ports (e.g., P2) belonging to the community secondary VLAN. For an isolated secondary VLAN (e.g., VLAN 102) connected to a smart PVLAN trunk port (e.g., P1), its traffic may only be forwarded to the promiscuous port (e.g., P3).

In embodiments of the present invention, the PVLAN switch usually use a MAC address table to store the MAC address, VLAN ID, and port ID. Those skilled in the art know that other mapping relationships, e.g., arrays and linked list, may also be used to store them. Here the MAC address table in the PVLAN switch is improved. As can be known by those skilled in the art, the MAC address table is part of the MAC learning mechanism of the PVLAN switch, and it stores the mapping relationships between the source MAC address extracted from the received frame, the ID of the VLAN to which the frame belongs and the receive port for future frame forwarding.

The structure of a traditional MAC address table is as shown in Table 1:

TABLE 1

| MAC address | VLAN ID | Port ID |
| --- | --- | --- | wherein the MAC address column is for storing the source MAC address of the received frame, the VLAN ID column is for storing the ID of the VLAN to which the frame belongs, and the port ID column is for storing the port receiving the frame.

The structure of the MAC address table improved according to an embodiment of the present invention is as shown in Table 2:

TABLE 2

| MAC address | VLAN ID | Port ID | Original VLAN ID |
| --- | --- | --- | --- |

It can be seen that compared with the traditional MAC address table, an original VLAN ID column is added in the improved MAC address table. If the smart PVLAN trunk port receives a frame, then the ID of the primary VLAN is stored in the VLAN ID column, and the ID of the secondary VLAN to which the frame belongs is stored in the original VLAN ID column; if a frame is received on a promiscuous port, then the ID of the primary VLAN to which the frame belongs is stored in both the VLAN ID column and the original VLAN ID column.

As shown in FIG. 3, the PVLAN switch receives a frame from the non-PVLAN switch 1 on the smart PVLAN trunk port P1, the frame having a destination MAC address A, source MAC address B, and VLAN ID 101, and the MAC address leaning mechanism in the PVLAN switch obtains the source MAC address B of the frame, the ID 100 of the primary VLAN to which the frame belongs, the receive port number P1 of the frame, and the ID 101 of the secondary VLAN to which the frame originally belongs, and inserts them into the MAC address table, i.e., Table 3, as an entry. The entry may be used for future frame forwarding.

TABLE 3

| MAC address | VLAN ID | Port ID | Original VLAN ID |
| --- | --- | --- | --- |
| B | 100 | P1 | 101 |

Assuming previously a frame sent to a community secondary VLAN (e.g., VLAN 101) and/or an isolated secondary VLAN (e.g., VLAN 102) from the smart PVLAN trunk port P1 was received on the promiscuous port, and the destination MAC address of the frame was B, its source MAC address was A, its VLAN ID was 100, the MAC address learning mechanism in the PVLAN switch obtained the source MAC address A of the frame, the ID 100 of the primary VLAN to which the frame belongs, the receive port number P3 of the frame, and the primary VLAN ID of the frame which was also 100, and inserted them into the MAC address table, i.e., Table 4, as an entry.

TABLE 4

| MAC address | VLAN ID | Port ID | Original VLAN ID |
|---|---|---|---|
| A | 100 | P3 | 100 |

Then for the frame sent to the promiscuous port P3 and including the secondary VLAN ID with the destination MAC address A, the source MAC address B, the VLAN ID 101, at step S203, the address table is queried according to the destination MAC address to get the primary VLAN ID 100 corresponding to the secondary VLAN ID 101, and the VLAN ID of the frame is modified as 100 corresponding to the VLAN ID in the address table, and then it is sent to port P3 corresponding to the port ID in the address table.

In an embodiment, the method shown in FIG. 2 further comprises: at step S205 (not shown in FIG. 2), receiving a second frame on a promiscuous port sent by the non-PVLAN device connected to the promiscuous port; at step S207 (not shown in FIG. 2), in response to that the second frame comprises a primary VLAN ID, the PVLAN switch port ID corresponding to the second frame and the secondary VLAN ID related to the primary VLAN ID can be obtained based on the destination address of the second frame, and the PVLAN switch port corresponding to the second frame is one of: a promiscuous port; and a smart PVLAN trunk port: modifying the primary VLAN ID in the second frame into a secondary VLAN ID related to the second frame; and sending the modified second frame to the non-PVLAN device connected to the PVLAN switch port corresponding to the second frame from the PVLAN switch port corresponding to the second frame.

In a preferred embodiment, the method shown in FIG. 2 further comprises step S206 (not shown), to store the source address of the frame of the primary VLAN ID of the second frame, the primary VLAN ID and its related secondary VLAN ID, and the PVLAN switch port ID corresponding to the second frame. In fact, this step may be performed before or after step S207. This is an address learning process of the PVLAN switch. The learning results are as shown in Table 4. Those skilled in the art may know that if the source address of the frame of the primary VLAN ID of the second frame, the primary VLAN ID and its related secondary VLAN ID, and the PVLAN switch port ID corresponding to the second frame have been stored, then this step may be omitted. As can be known from the example that the MAC address in the MAC address table corresponds to the source MAC address of the sent frame used during learning, and the destination MAC address of the sent frame during querying.

Figure 4:
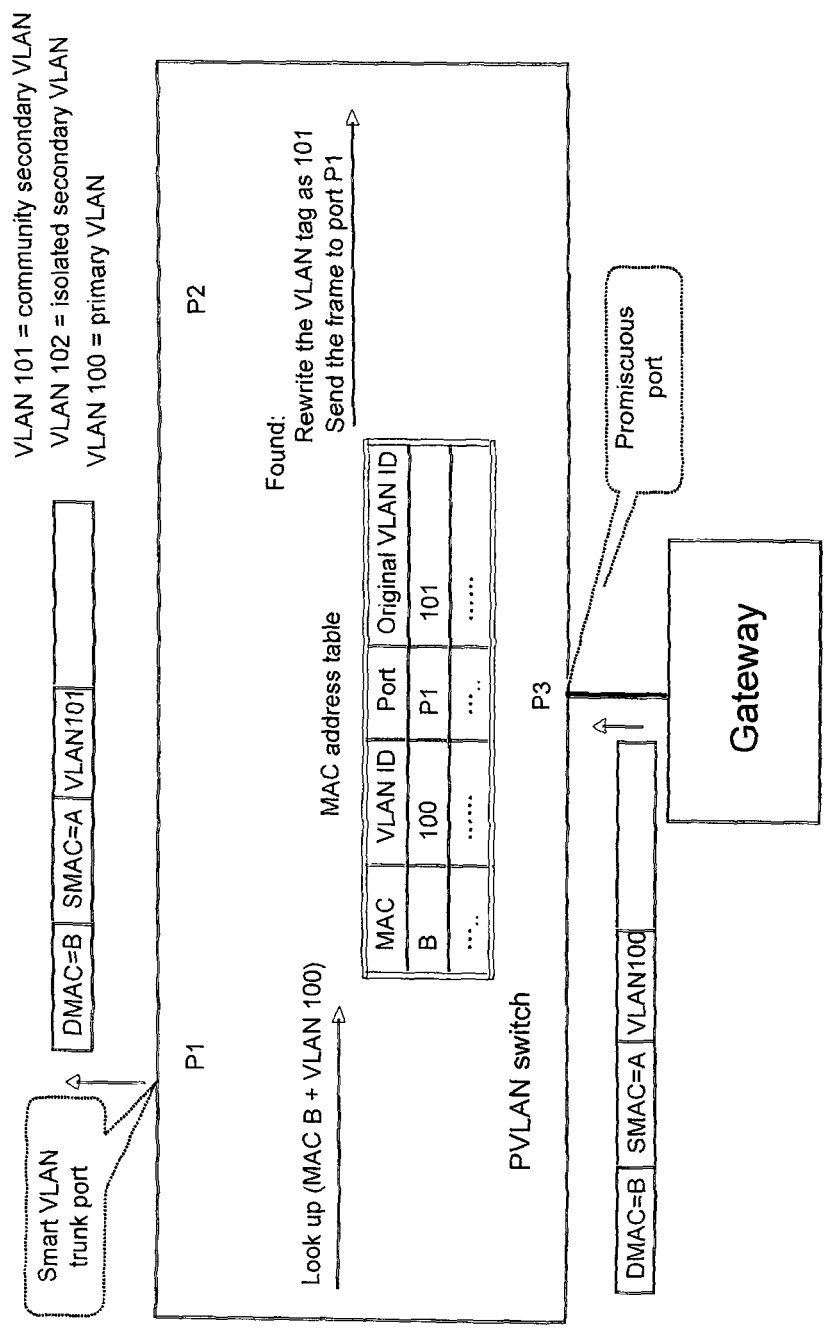
FIG. 4 shows an improved frame forwarding process of the PVLAN switch according to an embodiment of the present invention.

Now referring to FIG. 4, it shows the improved frame forwarding process of the PVLAN switch according to an embodiment of the present invention. As shown, when the PVLAN switch receives a frame with a destination MAC address B, source MAC address A, VLAN ID 100 on a promiscuous port P3, the PVLAN switch will look up the corresponding entry in the MAC address table, i.e., Table 3, according to the destination MAC address B and VLAN ID 100 of the frame, so as to get the send port P1 of the frame and the ID 101 of the primary VLAN, that is, the secondary VLAN ID related to the primary VLAN ID 100. Then, the PVLAN switch will use ID 101 of the found primary VLAN to rewrite VLAN ID 100 in the VLAN ID of the frame, and send the rewritten frame from the port ID in Table 3, i.e., P1.

FIG. 2 is a cross process, where the learning results of the smart PVLAN trunk port are queried by the promiscuous port, and the learning results of the promiscuous port are queried by the smart PVLAN trunk port.

Above is described the improved MAC address learning and forwarding process of frames transmitted between a smart PVLAN trunk port and a promiscuous port of the PVLAN switch according to an embodiment of the present invention. The MAC address learning process and forwarding process of frames transmitted between two smart PVLAN trunk ports of the PVLAN switch (i.e., transmitted in the same secondary VLAN) is the same as described above, and is omitted here.

In an embodiment, the method shown in FIG. 2 further comprises step S204 (not shown): in response to that the first frame comprises a secondary VLAN ID, and the primary VLAN ID corresponding to the secondary VLAN ID cannot be obtained based on the destination address of the first frame (e.g., the learning process has not yet happened, i.e., Table 3 or Table 4 has not yet existed), using a default entry to process.

In an embodiment, the method shown in FIG. 2 further includes step S208 (not shown): in response to that the second frame includes the primary VLAN ID, and that the secondary VLAN ID related to the primary VLAN ID cannot be obtained according to the destination address of the second frame, using the default entry to process.

In an embodiment, the method shown in FIG. 2 further comprises step S209 (not shown): in response to that the received frame is a broadcast frame, using a default entry to process, wherein the received frame is one of: the first frame; and the second frame.

Figure 5:
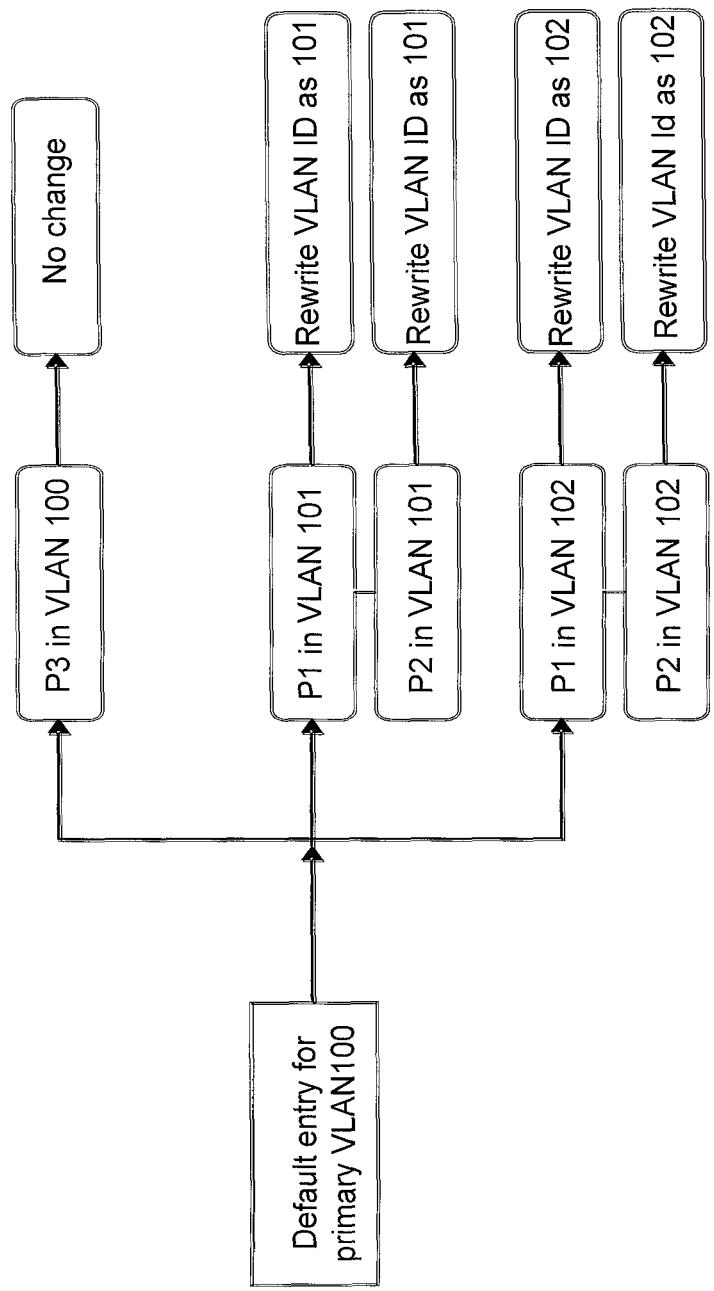
FIG. 5 schematically shows default entries for PVLAN and the use thereof in the forwarding process according to an embodiment of the present invention.

Now refer to FIG. 5 to explain default entries.

FIG. 5 schematically shows the default entry for the PVLAN and its uses during the forwarding process according to an embodiment of the present invention, the default entry being suitable for the primary VLAN and all the secondary VLANs in the PVLAN. As shown, the default entry is stored in the MAC address table, and there is a default entry for each PVLAN. For example, for PVLAN 100 (as introduced in the Background of the Invention part, the primary VLAN ID is used to represent the PVLAN), in the MAC address table, there are an entry for the promiscuous port P3 and primary VLAN 100, an entry for the smart PVLAN trunk port P1 and secondary VLAN 101, an entry for the smart PVLAN trunk port P2 and secondary VLAN 101, an entry for the smart PVLAN trunk port P1 and secondary VLAN 102, and an entry for the smart trunk port P2 and secondary VLAN 102. In an embodiment, these entries belong to the default entry PVLAN 100, and each entry is an option. Thus, when a broadcast frame belonging to the primary VLAN 100 or a frame for which a matching entry cannot be found in the MAC address table is received on the promiscuous port P3, the default entry will be hit. As shown in FIG. 5, the default entry include a plurality of options, and a copy of the frame will be generated for each option, and the VLAN ID in the copy is modified as the rewritten VLAN ID in the corresponding option, and the modified copy will be sent from the PVLAN switch port designated in the corresponding option. For example, ID 101 of the secondary VLAN is used to rewrite ID 100 of the primary VLAN in the copy, and the copy is sent from port P1; ID 101 in the secondary VLAN is used to rewrite ID 100 of the primary VLAN in the copy, and the copy is sent from port P2; ID 102 in the secondary VLAN is used to rewrite ID 100 of the primary VLAN in the copy, and the copy is sent from port P1; ID 102 of the secondary VLAN is used to rewrite ID 100 of the primary VLAN in the copy, and the copy is sent from port P2. Here the copy of P3 in VLAN 100 is not made, because the frame per se is received on port P3, and according to the current technique, the copy should not be sent from P3 again. This is the prior art, and is pointed out for better understanding.

These default entries may be automatically generated and updated when the user configures related contents of the PVLAN (e.g., creating or deleting the secondary VLANs or the primary VLAN, adding or deleting a VLAN from the VLANs).

Above is described the flow of a method of connecting PVLAN switch to a non-PVLAN device according to an embodiment of the present invention with reference to the accompanying drawings. It should be pointed out that the above description is merely exemplary, rather than limitation to the present invention. In addition, as those skilled in the art may appreciate, the above description actually also discloses a PVLAN switch. In the following, referring to FIG. 6, it shows an exemplary structural diagram of a PVLAN switch according to an embodiment of the present invention, and for the more detailed contents of the PVLAN switch, reference may be made to the above description.

Figure 6:
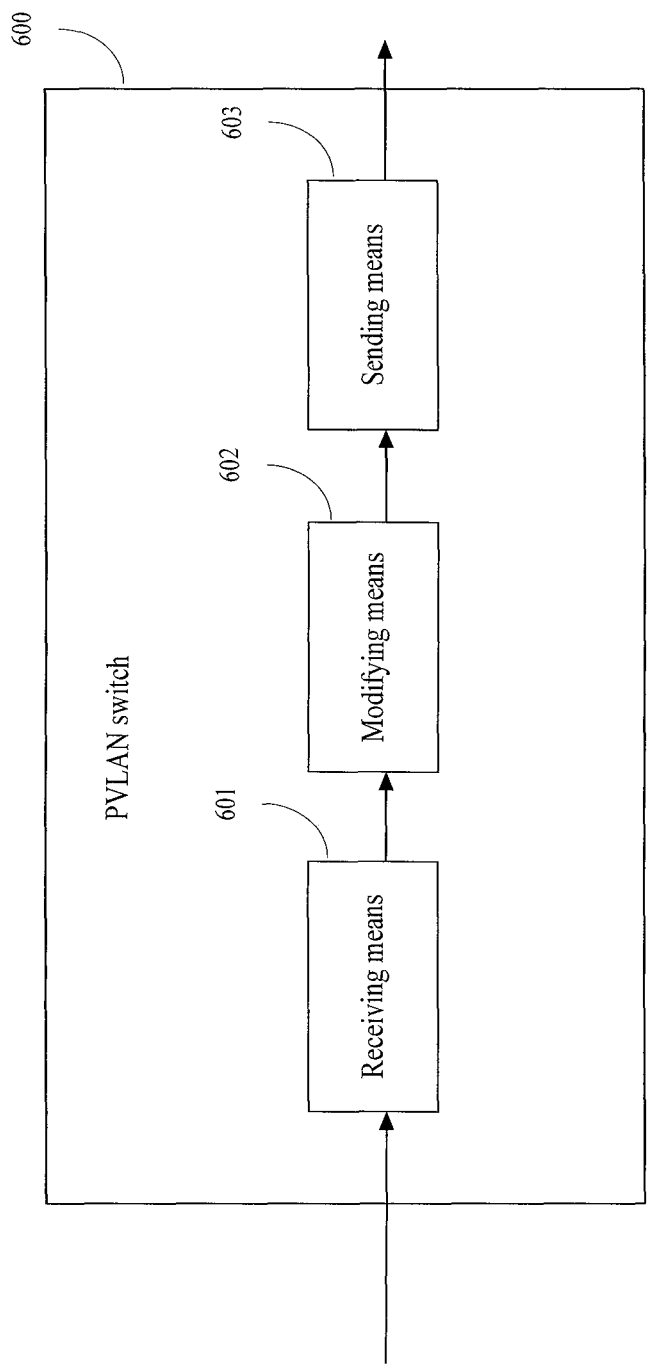
FIG. 6 shows a schematically structural diagram of a PVLAN switch according to an embodiment of the present invention.

According to the embodiment of the present invention, the PVLAN switch 600 is configured as a primary VLAN and at least two secondary VLANs related to the primary VLAN, the primary VLAN comprises at least one promiscuous port, each of the at least two secondary VLANs comprises at least one smart PVLAN trunk port, and the smart PVLAN trunk port is included in the at least two secondary VLANs, wherein the smart PVLAN trunk port and the promiscuous port are for connecting the non-PVLAN device. As shown in FIG. 6, the PVLAN switch 600 comprises: receiving means 601 configured to receive a first frame on a smart PVLAN trunk port sent from a non-PVLAN device connected to the smart PVLAN trunk port; in response to that the first frame comprises the secondary VLAN ID, the PVLAN switch port ID corresponding to the first frame and the primary VLAN ID related to the secondary VLAN ID included in the first frame can be obtained based on the destination address of the first frame, and the PVLAN switch port corresponding to the first frame is a non-isolated port; modifying means 602 configured to modify the secondary VLAN ID in the first frame into the primary VLAN ID related to the secondary VLAN; sending means 603 configured to send the modified first frame to the non-PVLAN device connected to the PVLAN switch port corresponding to the first frame.

According to an embodiment of the present invention, the PVLAN switch further comprises: storing means (not shown in FIG. 6) configured to store the source address of the first frame, the secondary VLAN ID and its related primary VLAN ID, and the PVLAN switch port ID corresponding to the first frame.

According to an embodiment of the present invention, the receiving means 601 is further configured to receive a second frame on the promiscuous port sent by the non-PVLAN device connected to the promiscuous port; in response to that the second frame comprises a primary VLAN ID, the PVLAN switch port ID corresponding to the second frame and the secondary VLAN ID related to the primary VLAN ID can be obtained based on the destination address of the second frame, and the PVLAN switch port corresponding to the second frame is one of: a promiscuous port; and a smart PVLAN trunk port; the modifying means 602 is further configured to modify the primary VLAN ID in the second frame into a secondary VLAN ID related to the second frame; the sending means 603 is further configured to send the modified second frame to the non-PVLAN device connected to the PVLAN switch port corresponding to the second frame from the PVLAN switch port corresponding to the second frame.

According to an embodiment of the present invention, the storing device is further configured to store the source address of the frame of the primary VLAN ID of the second frame, the primary VLAN ID and its related secondary VLAN ID, and the PVLAN switch port ID corresponding to the second frame.

According to an embodiment of the present invention, the PVLAN switch further comprises: default entry processing means (not shown in FIG. 6) configured to, in response to that the first frame comprises a secondary VLAN ID and the primary VLAN ID related to the secondary VLAN ID cannot be obtained based on the destination address of the first frame, use a default entry to process.

According to an embodiment of the present invention, the default entry processing mean is further configured to, in response to that the second frame comprises the primary VLAN ID and the secondary VLAN ID related to the primary VLAN ID cannot be obtained based on the destination address of the second frame, use a default entry to process.

According to an embodiment of the present invention, the default entry processing means is further configured to, in response to that the received frame is a broadcast frame, use a default entry to process, wherein the received frame is one of: a first frame; and a second frame.

According to an embodiment of the present invention, the default entry comprises a plurality of options, and the default entry processing device is further configured to: for each option, generate a copy of the frame, and modify the VLAN ID in the copy into the rewritten VLAN ID in the corresponding option, and send the modified copy from the PVLAN switch port designated in the corresponding option.

According to the embodiment of the present invention, the non-isolated port is one of: a promiscuous port; a smart PVLAN trunk port.

Above is described a method and a PVLAN switch according to embodiments of the present invention. It should be pointed out that the above description is merely exemplary, rather than limitation to the present invention. In other embodiments of the present invention, the method may have more, less or different steps, and the relationships of sequence, inclusion, function among the steps may be different from that is described; the PVLAN switch may have more, less or different modules, and the relationships of connection, inclusion, function among the modules may be different from that is described.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for connecting a private virtual local area network PVLAN switch to a non-PVLAN device, the system comprising:
   a PVLAN switch configured as a primary VLAN that includes at least one promiscuous port for connecting to non-PVLAN devices, and at least one smart PVLAN trunk port for connecting non-PVLAN devices;
   at least two secondary VLANs related to the primary VLAN, each of the at least two secondary VLANs including at least the one smart PVLAN trunk port, and the at least one smart PVLAN trunk port is included in at least two secondary VLANs;
   the system operated to perform a method comprising:
      receiving a first frame on a smart PVLAN trunk port sent from a non-PVLAN device connected to the smart PVLAN trunk port, the first frame including a destination address and a secondary VLAN ID;
      identifying, based on the destination address of the first frame, the PVLAN switch port ID corresponding to the first frame, and the primary VLAN ID related to the secondary VLAN ID;
      in response to determining that the PVLAN switch port corresponding to the first frame is a non-isolated port:
         modifying the secondary VLAN ID in the first frame to be the primary VLAN ID related to the secondary VLAN; and
         sending the modified first frame to another non-PVLAN device connected to the PVLAN switch port corresponding to the first frame from the PVLAN switch port corresponding to the first frame.

2. The system of claim 1, wherein the method further comprises:
   receiving a second frame on the promiscuous port sent from a non-PVLAN device connected to the promiscuous port, the second frame including a destination address and a primary VLAN ID;

identifying, based on the destination address of the second frame, the PVLAN switch port ID corresponding to the second frame, and the secondary VLAN ID related to the primary VLAN ID;

in response to determining that the PVLAN switch port corresponding to the second frame is one of a promiscuous port and a smart PVLAN trunk port:

modifying the primary VLAN ID in the second frame to be a secondary VLAN ID related to the second frame; and sending the modified second frame to the non-PVLAN device connected to the PVLAN switch port corresponding to the second frame from the PVLAN switch port corresponding to the second frame.

3. The system of claim 1, wherein the method further comprises:

in response to determining that the first frame comprises a secondary VLAN ID, and the primary VLAN ID related to the secondary VLAN ID cannot be obtained based on the destination address of the first frame, using a default entry to process.

4. The system of claim 3, wherein the default entry comprises a plurality of options, and using the default entry to process comprises: for each option, generating a copy of the first frame, modifying the VLAN ID in the copy to be the rewritten VLAN ID in the corresponding option, and sending the modified copy from the PVLAN switch port designated in the corresponding option.

5. The system of claim 1, wherein the method further comprises:

in response to determining that the second frame comprises the primary VLAN ID, and that the secondary VLAN ID related to the primary VLAN ID cannot be obtained based on the destination address of the second frame, using a default entry to process.

6. The system of claim 5, wherein the default entry comprises a plurality of options, and the using the default entry to process comprises: for each option, generating a copy of the second frame, modifying the VLAN ID in the copy to be the rewritten VLAN ID in the corresponding option, and sending the modified copy from the PVLAN switch port designated in the corresponding option.

7. The system of claim 1, wherein the method further comprises:

in response to determining that the received frame is a broadcast frame, using a default entry to process, wherein the received frame is one of: a first frame and a second frame.

8. The system of claim 1, wherein the non-isolated port is one of: a promiscuous port; and a smart PVLAN trunk port.

9. A computer program product for connecting a private virtual local area network PVLAN switch to a non-PVLAN device, the PVLAN switch configured as a primary VLAN that includes at least one promiscuous port for connecting non-PVLAN devices and at least one smart PVLAN trunk port for connecting non-PVLAN devices, at least two secondary VLANs are related to the primary VLAN, each of the at least two secondary VLANs including the at least one smart PVLAN trunk port for connecting non-PVLAN devices, and the at least one smart PVLAN trunk port is included in at least two secondary VLANs, the computer program product comprising:

one or more non-transitory computer-readable tangible storage media and program instructions stored on at least one of the one or more non-transitory computer-readable tangible storage media, the program instructions, when executed by the PVLAN switch and the at least two secondary VLANs, causing the PVLAN switch and the at least two secondary VLANs to perform a method comprising:

receiving a first frame on a smart PVLAN trunk port sent from a non-PVLAN device connected to the smart PVLAN trunk port, the first frame including a destination address and a secondary VLAN ID;

identifying, based on the destination address of the first frame, the PVLAN switch port ID corresponding to the first frame, and the primary VLAN ID related to the secondary VLAN ID;

in response to determining that the PVLAN switch port corresponding to the first frame is a non-isolated port:

modifying the secondary VLAN ID in the first frame to be the primary VLAN ID related to the secondary VLAN; and sending the modified first frame to another non-PVLAN device connected to the PVLAN switch port corresponding to the first frame from the PVLAN switch port corresponding to the first frame.

10. The computer program product of claim 9, wherein the method further comprises:

receiving a second frame on the promiscuous port sent from a non-PVLAN device connected to the promiscuous port, the second frame including a destination address and a primary VLAN ID;

identifying, based on the destination address of the second frame, the PVLAN switch port ID corresponding to the second frame, and the secondary VLAN ID related to the primary VLAN ID;

in response to determining that the PVLAN switch port corresponding to the second frame is one of a promiscuous port and a smart PVLAN trunk port:

modifying the primary VLAN ID in the second frame to be a secondary VLAN ID related to the second frame; and sending the modified second frame to the non-PVLAN device connected to the PVLAN switch port corresponding to the second frame from the PVLAN switch port corresponding to the second frame.

11. The computer program product of claim 9, wherein the method further comprises:

in response to determining that the first frame comprises a secondary VLAN ID, and the primary VLAN ID related to the secondary VLAN ID cannot be obtained based on the destination address of the first frame, using a default entry to process.

12. The computer program product of claim 11, wherein the default entry comprises a plurality of options, and using the default entry to process comprises: for each option, generating a copy of the first frame, modifying the VLAN ID in the copy to be the rewritten VLAN ID in the corresponding option, and sending the modified copy from the PVLAN switch port designated in the corresponding option.

13. The computer program product of claim 9, wherein the method further comprises:

in response to determining that the second frame comprises the primary VLAN ID, and that the secondary VLAN ID related to the primary VLAN ID cannot be obtained based on the destination address of the second frame, using a default entry to process.

14. The computer program product of claim 13, wherein the default entry comprises a plurality of options, and the using the default entry to process comprises: for each option, generating a copy of the second frame, modifying the VLAN ID in the copy to be the rewritten VLAN ID in the corresponding option, and sending the modified copy from the PVLAN switch port designated in the corresponding option.

15. The computer program product of claim 9, wherein the method further comprises:
   in response to determining that the received frame is a broadcast frame, using a default entry to process, wherein the received frame is one of: a first frame and a second frame.

16. The computer program product of claim 9, wherein the non-isolated port is one of: a promiscuous port; and a smart PVLAN trunk port.

17. A system for connecting a private virtual local area network PVLAN switch to a non-PVLAN device, the system comprising:
   a PVLAN switch configured as a primary VLAN that includes at least one promiscuous port for connecting to non-PVLAN devices, and at least one smart PVLAN trunk port for connecting non-PVLAN devices;
   at least two secondary VLANs related to the primary VLAN, each of the at least two secondary VLANs including at least the one smart PVLAN trunk port, and the at least one smart PVLAN trunk port is included in at least two secondary VLANs;
   the system operated to perform a method comprising:
      receiving a frame on the promiscuous port sent from a non-PVLAN device connected to the promiscuous port, the frame including a destination address and a primary VLAN ID;
      identifying, based on the destination address of the frame, the PVLAN switch port ID corresponding to the frame, and the secondary VLAN ID related to the primary VLAN ID;
      in response to determining that the PVLAN switch port corresponding to the frame is one of a promiscuous port and a smart PVLAN trunk port:
         modifying the primary VLAN ID in the frame to be a secondary VLAN ID related to the frame; and
         sending the modified frame to the non-PVLAN device connected to the PVLAN switch port corresponding to the frame from the PVLAN switch port corresponding to the frame.

18. The system of claim 17, wherein the method further comprises:
   in response to determining that the frame comprises the primary VLAN ID, and that the secondary VLAN ID related to the primary VLAN ID cannot be obtained based on the destination address of the frame, using a default entry to process.

19. The system of claim 18, wherein the default entry comprises a plurality of options, and the using the default entry to process comprises: for each option, generating a copy of the frame, modifying the VLAN ID in the copy to be the rewritten VLAN ID in the corresponding option, and sending the modified copy from the PVLAN switch port designated in the corresponding option.

20. The system of claim 17, wherein the method further comprises:
   in response to determining that the received frame is a broadcast frame, using a default entry to process.

* * * * *